US012002356B2

(12) United States Patent
Hossini et al.

(10) Patent No.: US 12,002,356 B2
(45) Date of Patent: Jun. 4, 2024

(54) SMART COMMUNICATION SYSTEM AT TRAFFIC INTERSECTIONS

(71) Applicants: Amir Hossini, Calgary (CA); Heather Lynn Friesen, Abu Dhabi (AE); Sara Aghakhani, Calgary (CA); Prabhpreet Sidhu, Mississauga (CA)

(72) Inventors: Amir Hossini, Calgary (CA); Heather Lynn Friesen, Abu Dhabi (AE); Sara Aghakhani, Calgary (CA); Prabhpreet Sidhu, Mississauga (CA)

( * ) Notice: Subject to any disclaimer, the term of this patent is extended or adjusted under 35 U.S.C. 154(b) by 174 days.

(21) Appl. No.: 17/687,628

(22) Filed: Mar. 5, 2022

(65) Prior Publication Data

US 2023/0282105 A1 Sep. 7, 2023

(51) Int. Cl.

| | |
|---|---|
| ***B60C 23/00*** | (2006.01) |
| ***G08G 1/087*** | (2006.01) |
| *H04R 1/08* | (2006.01) |
| *H04R 1/40* | (2006.01) |
| *H04R 3/00* | (2006.01) |

(52) U.S. Cl.
CPC ............... *G08G 1/087* (2013.01); *H04R 1/08* (2013.01); *H04R 1/406* (2013.01); *H04R 3/005* (2013.01)

(58) Field of Classification Search
CPC ................. G08G 1/087; G08G 1/0965; G08G 1/096716; G08G 1/096758; G08G 1/096775; G08G 1/096783; G08G 1/095; H04R 1/08; H04R 1/406; H04R 3/005
USPC ......................... 340/446, 907, 904, 909, 906
See application file for complete search history.

(56) References Cited

U.S. PATENT DOCUMENTS

| | | | | |
|---|---|---|---|---|
| 8,094,040 B1 * | 1/2012 | Cornett | G08G 1/087 | 340/916 |
| 10,964,206 B1 * | 3/2021 | Hill | G08G 1/048 | |
| 2012/0112927 A1 * | 5/2012 | Grieco | G08G 1/087 | 340/906 |
| 2014/0278029 A1 * | 9/2014 | Tonguz | G08G 1/161 | 701/117 |
| 2015/0213713 A1 * | 7/2015 | Taylor | G08G 1/0125 | 340/906 |
| 2020/0372793 A1 * | 11/2020 | Weizman | G08G 1/0112 | |

* cited by examiner

*Primary Examiner* — Anh V La
(74) *Attorney, Agent, or Firm* — The Law Firm of AQ Basit

(57) ABSTRACT

An electronic communications method includes receiving, by a device, electronic information. The electronic communications method also includes analyzing, by the device, the electronic information. The electronic communications method also includes determining, by the device, that the electronic information includes sound that is associated with an emergency vehicle. The electronic communications method also includes sending, by the device, an electronic command to change a traffic signal light from one color to another color.

16 Claims, 11 Drawing Sheets

SMART COMMUNICATION SYSTEM AT TRAFFIC INTERSECTIONS

BACKGROUND

Vehicles enter traffic intersections on a routine basis. Traffic intersections usually have stop signs or a traffic lights/signalization system. Traffic lights generally work with a red, yellow, and green light system with a red-light indicating vehicles to stop and a green-light indicating vehicles to move through the intersection.

In a normal traffic flow, vehicles will follow the requirements of the traffic light system. However, instances may occur where a vehicle may not be able to comply with the traffic light system requirement. For example, emergency vehicles, such as fire trucks, police cars, and ambulances, may be on their way to a medical or vehicle emergency and cannot stop at a red-light signal.

Because of such situations, the emergency vehicle may go through the intersection with a red-light signal. As such, collisions may occur when emergency vehicles passing through a red-light signal may collide with another vehicle that is entering the same intersection and has a green-light signal. Accordingly, there is not an automated or near-instantaneous system that changes the red-light signal to a green-light based on a presence of an emergency vehicle that is entering a traffic intersection.

DETAILED DESCRIPTION OF PREFERRED EMBODIMENTS

The following detailed description refers to the accompanying drawings. The same reference numbers in different drawings may identify the same or similar elements.

Systems, devices, and/or methods described herein may allow for changing a light indicator (e.g., red, yellow, green) for a traffic light system (e.g., also described as a traffic signal, traffic signals, or as traffic lights in the following description) based on the sound of a vehicle (e.g., a siren associated with an emergency vehicle) that will pass through an intersection associated with the traffic light system. The change in the traffic light system's light color may occur in a manner that does not require large amounts of stored data and can change the lights automatically. Furthermore, the systems, devices, and/or methods described herein may not require any systems or devices to be connected to the vehicle, such as an emergency vehicle (e.g., a police car, ambulance, fire truck, etc.).

In embodiments, systems, devices, and/or methods described herein may include a microphone system, a raspberry Pi system, and an electronic learning system (e.g., an Artificial Intelligence (AI) system). In combination, these systems can (1) obtain sound information from a vehicle approaching an intersection via microphone connected to the raspberry Pi system, (2) send the sound information to an electronic learning system, (3) analyzing the sound information by the learning system, and (4) sending a decision to the raspberry Pi on whether to change the traffic light color based on the decision by the learning system. This signal is subsequently transmitted to the traffic light controller system (part of the traffic light system) to change or keep the light color of the traffic signal.

Accordingly, the systems, devices, and/or methods described herein are robust and cost-effective, and simple to implement as there is no requirement to install any transmission devices onto the vehicles or on any nearby pavement. Furthermore, operating costs are reasonably low since the lowest tier of cloud computing services can be utilized for training the electronic learning system. In alternate embodiments, pre-trained models may be directly deployed to the raspberry Pi system without the need for cloud connectivity and/or a separate learning system. Furthermore, the systems, devices, and/or methods described herein are not impacted by weather conditions or poor visibility levels.

Figure 1A:
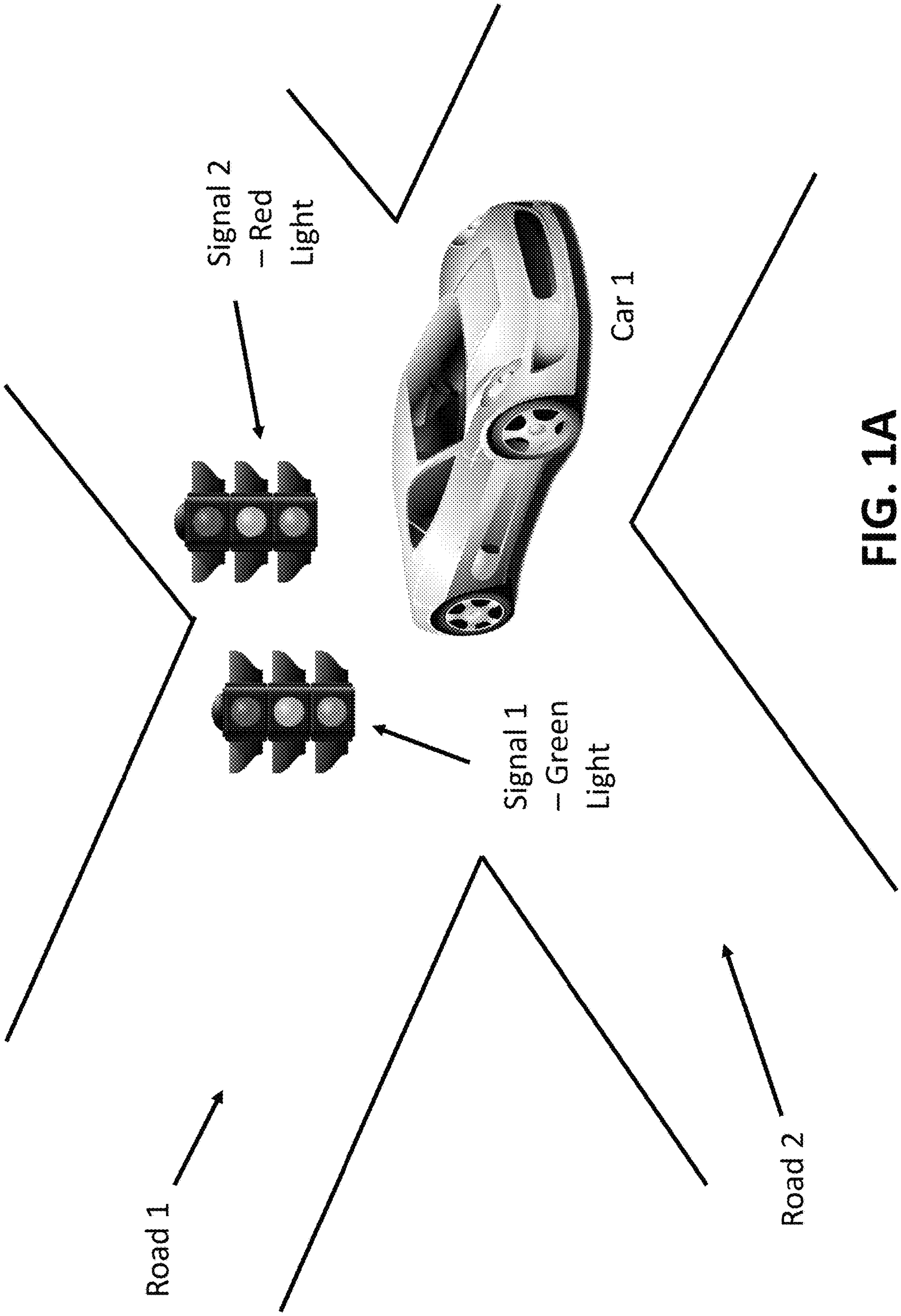
FIGS. 1A-1B is a diagram of an example environment in which systems and/or methods described herein may be implemented.
Figure 1B:
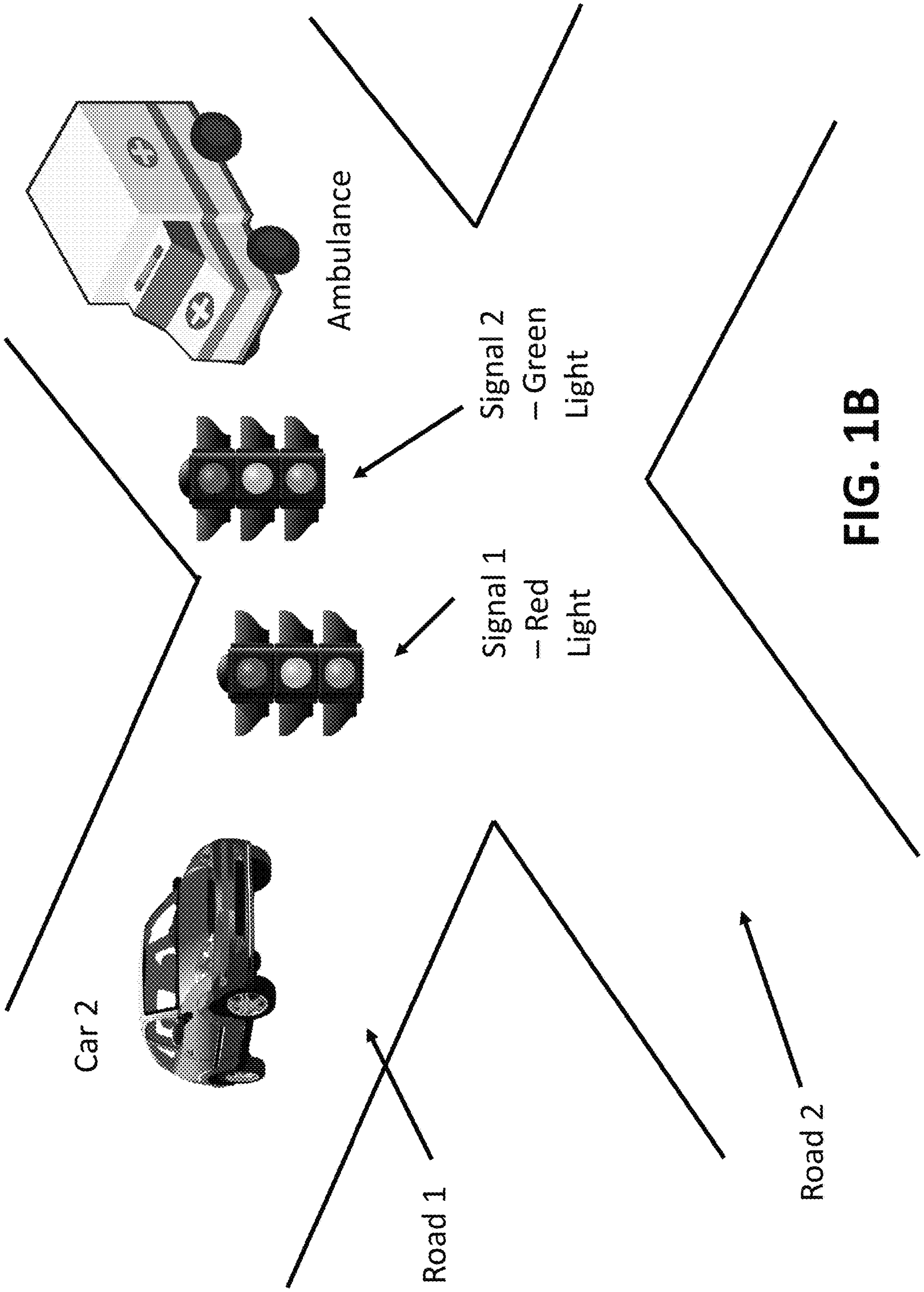

FIGS. 1A to 1B show an example environment describing the communication system. As shown in FIG. 1A, an intersection between Road 1 and Road 2 is shown along with Car 1 travelling along Road 1. As shown in FIG. 1A, Signal 1 controls traffic flow on Road 1 and Signal 2 controls traffic flow on Road 2. At the particular moment in time shown in FIG. 1A, Signal 1 has a green-light while Signal 2 has a red-light.

At a later time, as shown in FIG. 1B, an ambulance is travelling on Road 2 toward the intersection of Road 1 and Road 2. In this non-limiting example, a noise receiving system (e.g., a microphone that in this example is attached to a nearby utility pole or the exterior façade of a building located on road 1 and another building located on road 2) receives the ambulance's siren noise which is then communicated to a Raspberry Pi system. In embodiments, the Raspberry Pi system then sends an electronic communication including noise characteristics to a learning system (e.g., Artificial Intelligence (AI) system) that determines whether the noise (e.g., sound) is associated with an emergency vehicle. In this non-limiting example, the learning system determines that the noise is associated with an emergency vehicle, namely the ambulance, and through a Raspberry Pi system sends signal to traffic light controller which in turn changes Signal 1 to a red light and Signal 2 to a green light.

Figure 2:
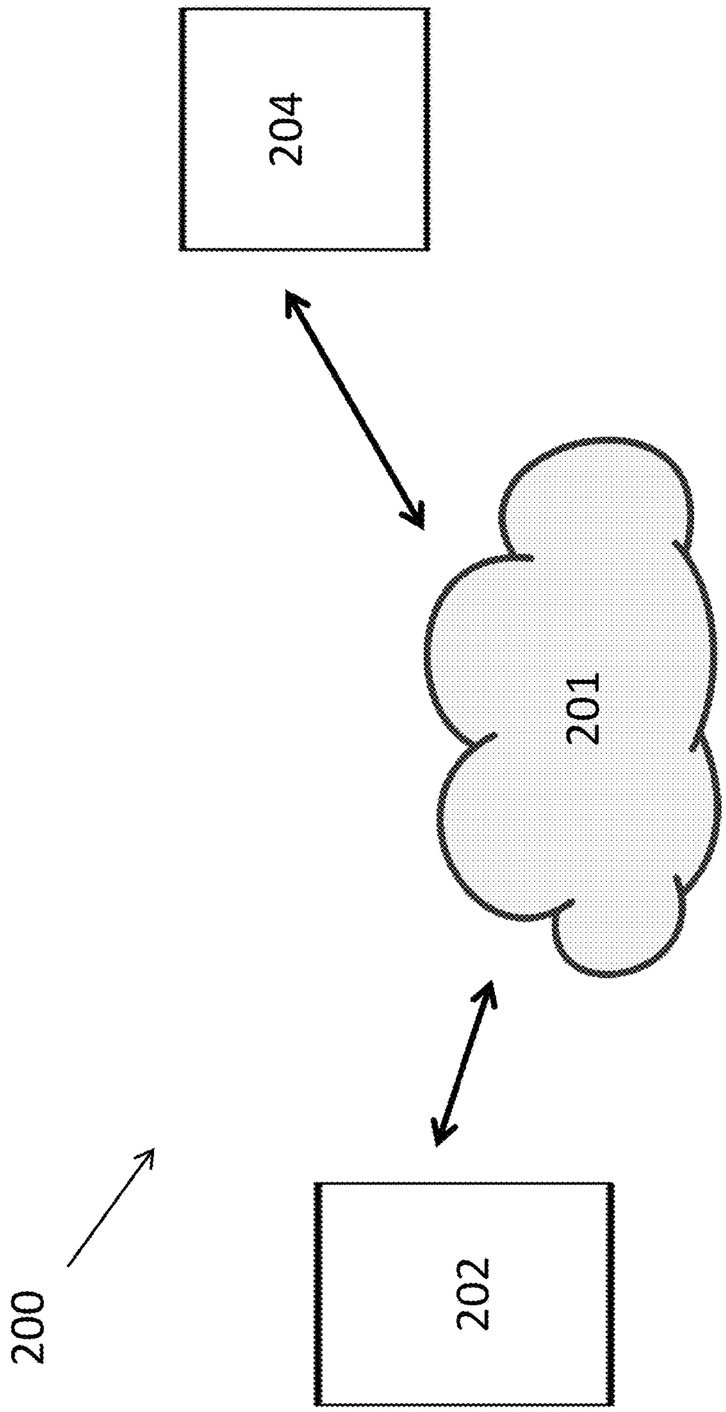
FIG. 2 is a diagram of a network environment.

FIG. 2 is a diagram of example environment 200 in which systems, devices, and/or methods described herein may be implemented. FIG. 2 shows network 201, device 202, and system 204. Network 201 may include a local area network (LAN), wide area network (WAN), a metropolitan network (MAN), a telephone network (e.g., the Public Switched Telephone Network (PSTN)), a Wireless Local Area Networking (WLAN), a WiFi, a hotspot, a Light fidelity (LiFi), a Worldwide Interoperability for Microware Access (WiMax), an ad hoc network, an intranet, the Internet, a satellite network, a GPS network, a fiber optic-based network, and/or combination of these or other types of networks.

Additionally, or alternatively, network 201 may include a cellular network, a public land mobile network (PLMN), a second generation (2G) network, a third generation (3G) network, a fourth generation (4G) network, a fifth generation (5G) network, and/or another network. In embodiments, network 122 may allow for devices describe in any of the figures to electronically communicate (e.g., using emails, electronic signals, URL links, web links, electronic bits, fiber optic signals, wireless signals, wired signals, etc.) with each other so as to send and receive various types of electronic communications. In embodiments, network 201 may include a cloud network system that incorporates one or more cloud computing systems.

Device 202 may include any computation or communications device that is capable of communicating with a network (e.g., network 201). For example, device 202 may include a wireless communication device, a satellite communication device, and/or any other type of communication system that can receive noise information, convert the noise information into electronic information and send the electronic information to other computing systems/devices such as system 204. In embodiments, device 202 may be attached to a traffic light signal system. In alternate embodiments, device 202 may be attached within a particular distance of a traffic light signal system and may receive information from the traffic light signal system itself which may have an integration communication device that communicates with device 202

System 204 may include one or more computational or communication devices that gather, process, and/or provide information relating to determining the source of noise information originally sent to device 202. In embodiments, system 204 may include one or more systems that can analyze electronic information associated with a particular noise/sound and then determine whether the source of the electronic information is an emergency vehicle or a non-emergency vehicle. In embodiments, device 202 may be a part of system 204 or may be separate from system 204. In embodiments, device 202 may be similar to a microphone device such as microphone 404. In embodiments, system 404 may include device 406 and/or 410. In embodiments, system 404 may include additional networking features, such as network 408.

Figure 3:
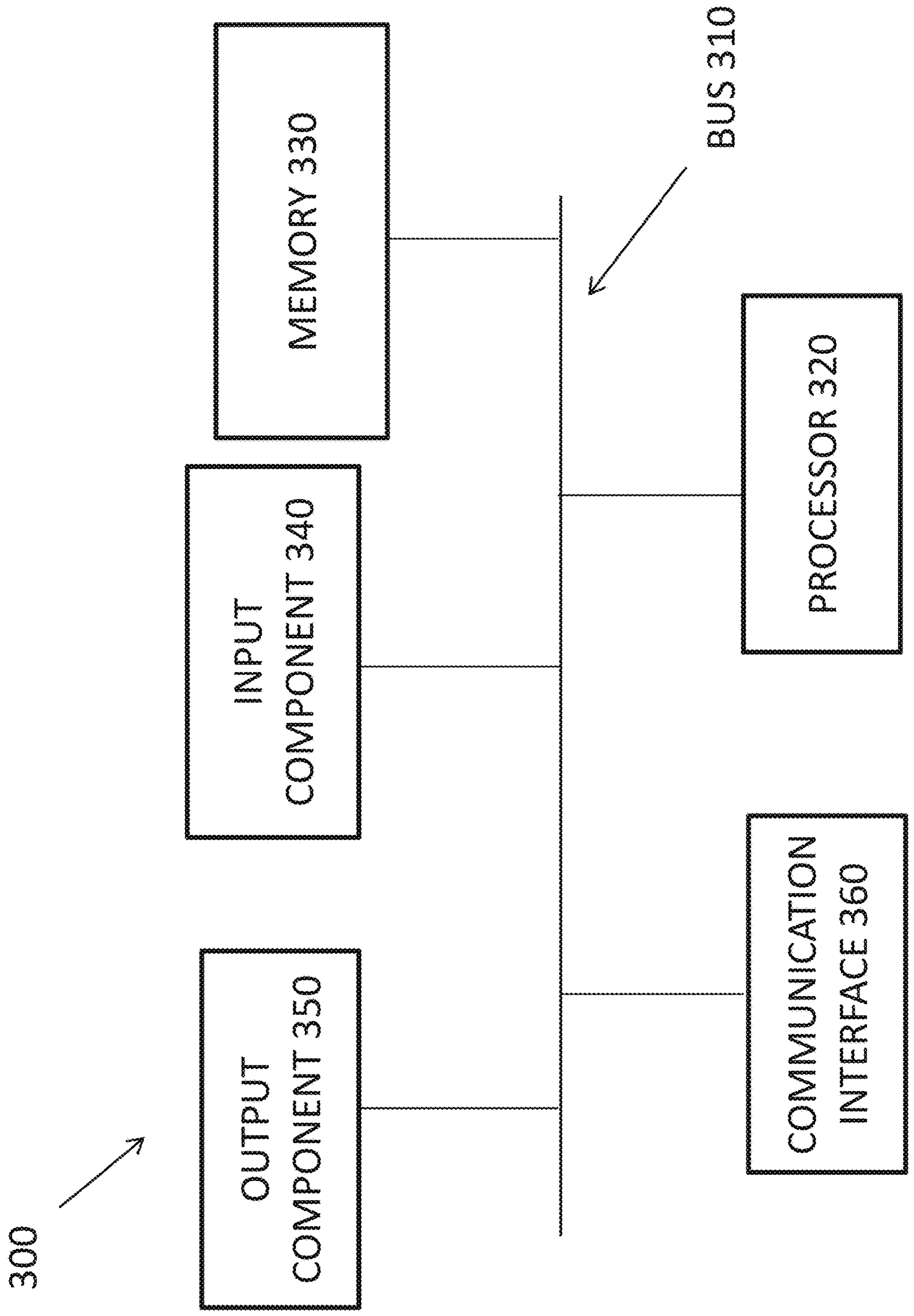
FIG. 3 is a diagram of an example computing device.

FIG. 3 is a diagram of example components of a device 300. Device 300 may correspond to network 201, device 202, and/or system 204. Alternatively, or additionally, network 201, device 202, and/or system 204, may include one or more devices 300 and/or one or more components of device 300.

As shown in FIG. 3, device 300 may include a bus 310, a processor 320, a memory 330, an input component 340, an output component 350, and a communications interface 360. In other implementations, device 300 may contain fewer components, additional components, different components, or differently arranged components than depicted in FIG. 3. Additionally, or alternatively, one or more components of device 300 may perform one or more tasks described as being performed by one or more other components of device 300.

Bus 310 may include a path that permits communications among the components of device 300. Processor 320 may include one or more processors, microprocessors, or processing logic (e.g., a field programmable gate array (FPGA) or an application specific integrated circuit (ASIC)) that interprets and executes instructions. Memory 330 may include any type of dynamic storage device that stores information and instructions, for execution by processor 320, and/or any type of non-volatile storage device that stores information for use by processor 320. Input component 340 may include a mechanism that permits a user to input information to device 300, such as a keyboard, a keypad, a button, a switch, voice command, etc. Output component 350 may include a mechanism that outputs information to the user, such as a display, a speaker, one or more light emitting diodes (LEDs), etc.

Communications interface 360 may include any transceiver-like mechanism that enables device 300 to communicate with other devices and/or systems. For example, communications interface 360 may include an Ethernet interface, an optical interface, a coaxial interface, a wireless interface, or the like. In another implementation, communications interface 360 may include, for example, a transmitter that may convert baseband signals from processor 320 to radio frequency (RF) signals and/or a receiver that may convert RF signals to baseband signals. Alternatively, communications interface 360 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications.

Communications interface 360 may connect to an antenna assembly (not shown in FIG. 3) for transmission and/or reception of the RF signals. The antenna assembly may include one or more antennas to transmit and/or receive RF signals over the air. The antenna assembly may, for example, receive RF signals from communications interface 360 and transmit the RF signals over the air, and receive RF signals over the air and provide the RF signals to communications interface 360. In one implementation, for example, communications interface 360 may communicate with network 201.

As will be described in detail below, device 300 may perform certain operations. Device 300 may perform these operations in response to processor 320 executing software instructions (e.g., computer program(s)) contained in a computer-readable medium, such as memory 330, a secondary storage device (e.g., hard disk), or other forms of RAM or ROM. A computer-readable medium may be defined as a non-transitory memory device. A memory device may include space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Figure 4:
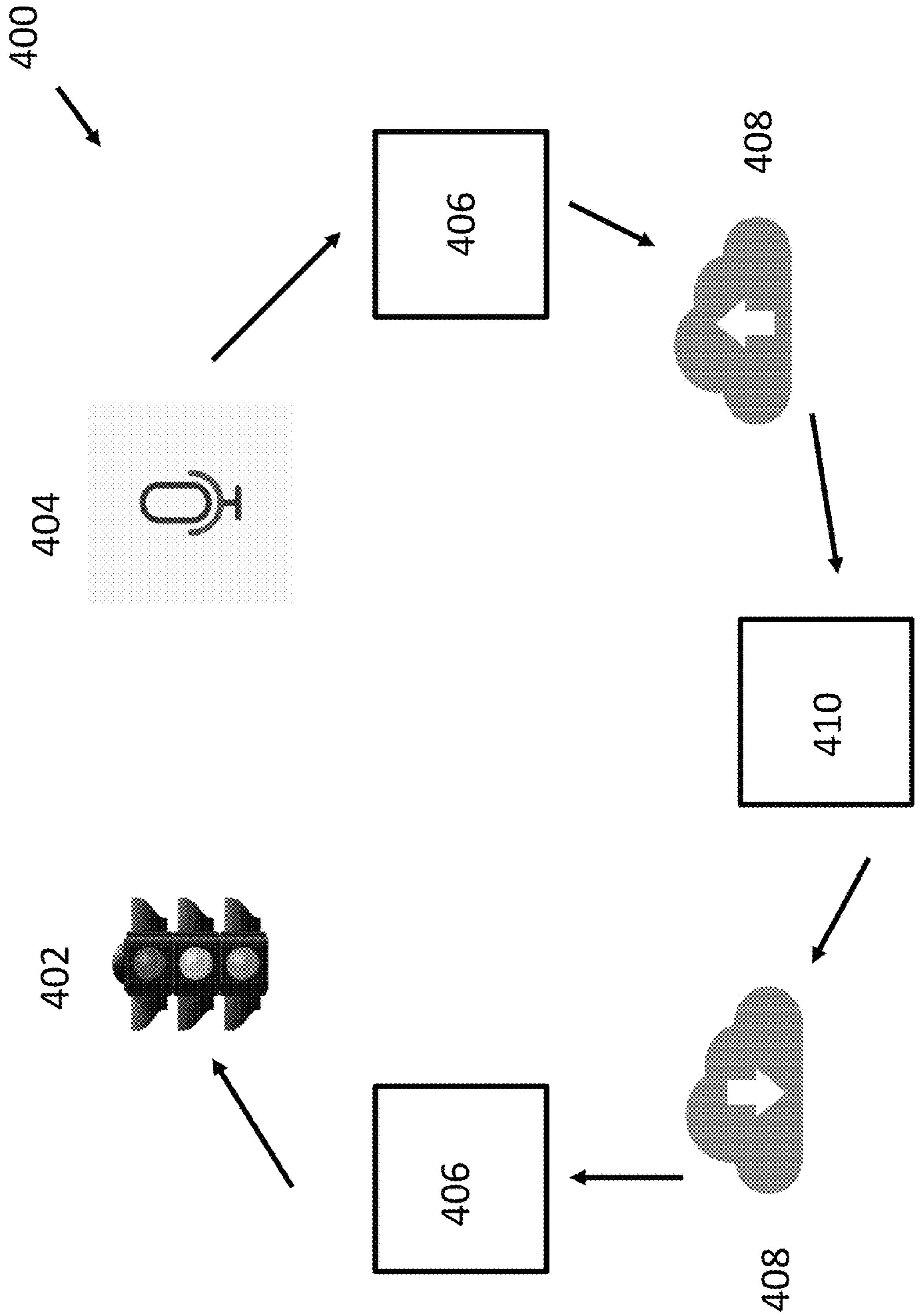
FIG. 4 is a diagram of an example system.

FIG. 4 describes a schematic diagram of example diagram 400. FIG. 4 shows signal 402, microphone 404, device 406, network 408, and device 410. In embodiments, signal 402, microphone 404, device 406, network 408, and device 410 may have one or more features that are similar to the example components of device 300 described in FIG. 3. In embodiments, signal 402 may be a traffic signal or any other device which has two or more colors that indicate whether travelling is permitted through an intersection. While FIG. 4 shows one traffic signal as signal 402, signal 402 may include multiple traffic signals. For example, an intersection of two roads will have more than one traffic signal and signal 402 may represent the multiple traffic signals. In embodiments, an intersection may be an intersection of two roads or a road and a pedestrian walkway. In embodiments, microphone 404 may be a device that can obtain noise, sounds, etc. from a particular source of noise (e.g., a siren noise from an emergency vehicle). In embodiments, microphone 404 may be attached to signal 402.

In alternate embodiments, microphone 404 may be within a particular distance from signal 402. In embodiments, microphone 404 may be attached to a utility pole, a building exterior façade, or other surface that allows for microphone 404 to pick up noise in a particular direction. For example, a first microphone 404 may be attached on a light pole that is at a certain distance from the traffic signal associated with a first road. In this non-limiting example, a second microphone 404 may be attached to another light pole that is at a certain distance from the signal that is associated with a second road. Thus, the first microphone 404 may receive sound information from vehicles on the first road and the second microphone 404 may receive other sound information from vehicles on the second road. In this non-limiting example, the location of the microphones prevents confusion as to which sound information is associated with the correct traffic signal. Thus, a Raspberry Pi system and a learning system send their information to change the traffic light. In embodiments, microphone 404 may send sound information to device 406. In embodiments, device 406 may be a computing device that receives noise information from microphone 404. In embodiments, device 406 may be a Raspberry Pi device. In embodiments, device 406 may digitize the received noise In embodiments, device 406 may use Fourier transformation to convert electronic noise information into spectrograms.

In embodiments, noise sent from microphone 404 to device 406 may occur during a particular time period that is based on the time of day. For example, during rush hour (e.g., 6:00 AM to 9:00 AM), microphone 404 may send noise information (as electronic information) in an electronic communication to device 406 every five seconds. However, at another time (e.g., 11:00 AM to 2:00 PM), microphone 404 may send the noise information in an electronic communication to device 406 every 10 second. In embodiments, the noise information sent from microphone 404 to device 406 may occur during a particular time period that is based on the type of intersection. For example, an intersection of two roads may send noise information with more frequency (e.g., every five seconds) than an intersection of a road and a pedestrian walkway (e.g., every 15 seconds).

In embodiments, the noise information sent from microphone 404 to device 406 may occur during a particular time period that is based on the maximum speed limit for the intersection. For example, if both roads at a particular intersection have a maximum speed limit of 45 miles per hour, then microphone 404 may send noise information to device 406 every five seconds. However, for example, if one road at a particular intersection has a maximum speed limit of 40 miles per hour and the other road at the particular intersection has a maximum speed of 30 miles per hour, then microphone 404 may send noise information to device 406 every six seconds based on calculating an average.

In embodiments, the noise information sent from microphone 404 to device 406 may occur during a particular time period based on past accident history associated with an intersection. For example, if a particular intersection has had "x" number of accidents within the last 12 months involving emergency vehicles or non-emergency vehicles, then microphone 404 may send noise information to device 406 every five seconds. For another intersection, for example, there have been "y" number of accidents (with x being greater than y) within the last 12 months. For this intersection, microphone 404 may, for example, send noise information to device every eight seconds or another time amount. In embodiments, the amount of time to send noise information may be based on other factors, such as location, weather conditions, time of year, etc. and is part of design In embodiments, the noise information sent from microphone 404 to device 406 may occur during a particular time period based on geographic location. For example, for an intersection located in a downtown area (e.g., downtown Atlanta), microphone 404 may send noise information to device 406 every six second while an intersection located in a rural town (e.g., Danville, New York), microphone 404 may send noise information to device 406 every 10 seconds. In alternate embodiments, network 408 may be a cloud computing system.

In embodiments, the noise information sent from microphone 404 to device 406 may occur during a particular time period based on the types of buildings around the intersection.

In embodiments, the noise information sent from microphone 404 to device 406 may occur during a particular time period that is based on multiple factors that may include (1) time of day, (2) type of intersection, (3) geographic location, (4) past accident history associated with an intersection, and/or (5) type of buildings around the intersection.

In embodiments, device 406 may send electronic information, that includes characteristics of the noise information originally received by microphone 404, to device 410 via network 408. In embodiments, network 408 may be similar to network 201 as described in FIG. 2. In embodiments, network 408, may receive the electronic information from device 406 and send the electronic information to device 410.

In embodiments, device 410 may be a pre-trained artificial intelligence system (e.g., a learning system) that receives electronic information and determines, based on the electronic information, the source of the noise information that was received by microphone 404.

In alternate embodiments, device 410 (e.g., a pretrained artificial intelligence (AI) system) may be combined with system 406 and thus result in omitting network 408.

In embodiments, device 410 may include one more different systems, including Convolutional Neural Networks (CNN) and Long Short Term Memory (LSTM) systems that receive electronic information which is then used by the pre-trained CNN and LSTM systems to identify the source of noise information received by microphone 404. In embodiments, the electronic information received by the CNN and LSTM systems may be received as spectrograms or may be received in other electronic formats.

In embodiments, the pre-training of the CNN and LSTM system are conducted prior to the deployment of the systems using the traffic noise data (including emergency vehicle sirens from any jurisdiction of interest).

In embodiments, device 410 may determine that the noise information (and is part of the information sent to device 410 from device 406) is associated with an emergency vehicle. In embodiments, device 410 may send an electronic communication to device 406 (which may be the same device 406 that sent the electronic information to device 410) that an emergency vehicle is approaching. In embodiments, device 406 may receive the electronic communication and send an electronic communication to signal 402 that instructs signal 402 to change one color to a different color (e.g., from red to green for the incoming emergency vehicle and green to red for the traffic on the other road entering the intersection). In embodiments, signal 402 may have a communication device that receives the electronic communication from device 406.

Figure 5:
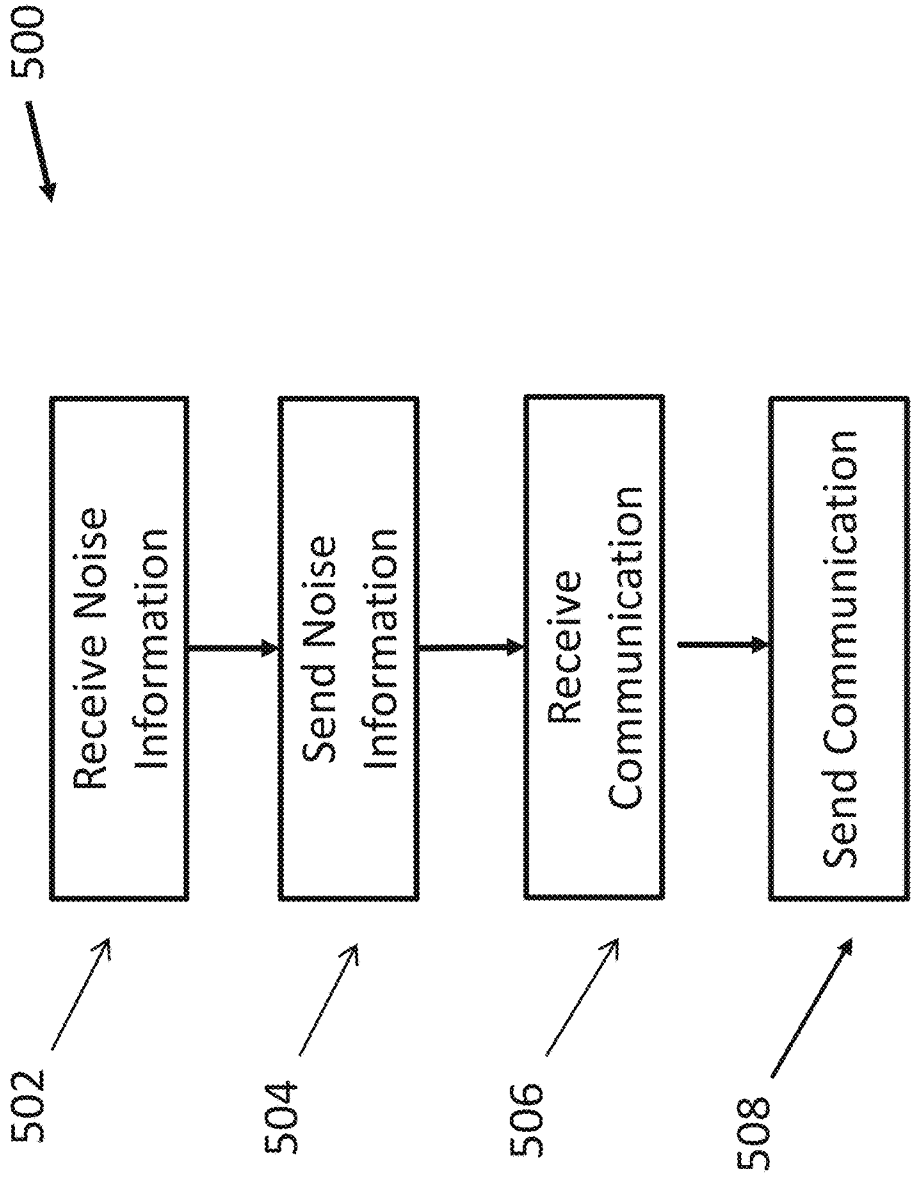
FIG. 5 is an example flow diagram for sending and receiving noise information.

FIG. 5 is a flow chart of an example process 500 for receiving noise information from a microphone and then receiving electronic information about the source of the noise information. In embodiments, example process 500 may be performed by device 406, described in FIG. 4. At step 502, device 406 may receive noise information. In embodiments, the noise information may be generated by a microphone (e.g., microphone 404) that receives noise/sounds from an environment in which a traffic signal is located. At step 504, device 406 may send noise information to device 410. At step 506, device 406 receives an electronic communication from device 410. In embodiments, the electronic communication may include an electronic command for device 406 to either (1) change a traffic light signal or (2) not change the traffic light signal. In embodiments, if the electronic command indicates changing a traffic signal light (based on a noise associated with an emergency vehicle), then the electronic command may request to make such a change automatically or on a delayed basis. At step 508, device 406 may send an electronic communication to a traffic signal (or device associated with the traffic signal) that indicates to the traffic signal to either change the traffic light or keep it the same.

Figure 6:
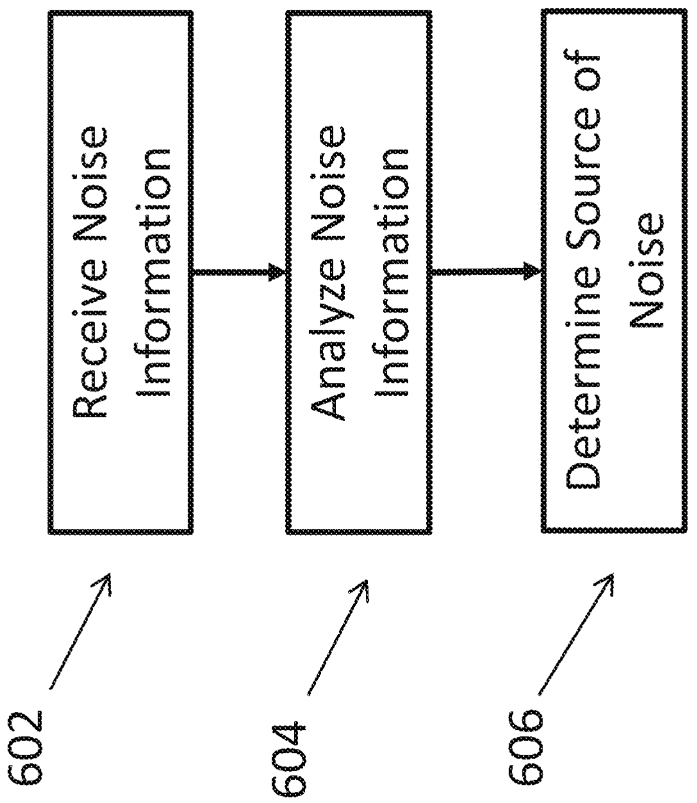
FIG. 6 is an example flow diagram for analyzing noise information.

FIG. 6 is a flow chart of an example process 600 for determining the source of a particular noise. In embodiments, example process 600 may be performed by device 410 as described in FIG. 5. At step 602, device 410 receives noise information. In embodiments, noise information may be received by device 410 as spectrograms. In embodiments, the noise information may have electronic labels that indicate particular information about the noise information. In embodiments, the electronic labels may include information that indicates location, time of day, and/or other information related to the noise information. In embodiments, the electronic labels may also indicate from which traffic signal the noise information is coming from. In alternate embodiments, device 410 may also receive other types of electronic information, including images.

In embodiments, device 410 may use the images (if visibility is good) to further enhance its ability to make determinations about whether to change the traffic signal light. However, device 410 does not require the use of images and may be considered as optional to making any final determination by device 410. At step 604, device 410 analyzes the noise information.

In embodiments, device 410 analyzes the noise information based on (1) the currently received noise information and (2) previously received noise information associated with other discreet time events. In embodiments, device 410 actively trains itself to determine noise source based on learning how different noises are associated with different sources. According, device 410 can more effectively determine whether a particular type of vehicle is associated with a particular noise. For example, device 410 can determine that a particular noise is associated with an emergency vehicle.

In embodiments, device 410 can determine the source of the noise (i.e., the noise information) based on determining one or more factors. For example, one factor may be based on particular characteristics of past noise analyzed by device 410 that were confirmed as being from a particular source, such as a siren from an ambulance, police, or fire engine vehicle. Also, for example, another factor may be based on time interval information. For example, if during the particular time interval, the noise has particular noise characteristics, then this may be used to determine that the noise is from a particular source, such as a siren from an ambulance, police, or fire engine vehicle. In another non-limiting example, another factor may be based on the time of day the noise information is received by device 410. Also, device 410 may analyze noises of other vehicles that are not emergency vehicles.

Also, device 410 may analyze noises of other vehicles that are not emergency vehicles. For example, non-emergency vehicles, such regular vehicles, buses, etc., may generate horn noise or other types of noises (such as ice cream trucks). Additionally, or alternatively, device 410 may analyze whether other noises, such as horn noises from non-emergency vehicles, are not present during a particular time interval. In embodiments, this may be achieved by the system to determine a siren (such as different types of sirens) versus road nose through characterizing the sound frequency at pre-determined time intervals. For example, non-emergency vehicles may honk their horn based on the absence of horn noises as non-emergency vehicles may not use their horn if they see an emergency vehicle proceeding towards a traffic intersection. Additionally, or alternatively, device 410 may analyze the sound of vehicle engine noise to determine if any heavy vehicles (e.g., trucks, buses, etc.) are proceeding towards the traffic intersection. Determining the presence of heavy vehicles may be used to determine whether it is safe to change traffic signals as it takes more time for a heavy vehicle to stop than a truck or a bus.

At step 606, device 410 may determine the source of noise based on additional factors. Once the source of the noise is determined, device 410 may send a communication to another device (e.g., device 406). In embodiments, the communication may indicate to device 406 that the source of the noise is an emergency vehicle and that the traffic signal lights should be changed. Alternatively, the communication may indicate to device 406 that the source of the noise is not an emergency vehicle and that the traffic signal lights should not be changed.

If the communication is indicating a change to the traffic signal lights, the communication may further indicate whether the traffic signal light should be changed automatically or whether device 406 should send a delayed communication to the traffic signal to make the change. In a non-limiting example, device 410 may determine from the noise and/or other information (e.g., image information) that a truck or other type of heavy vehicle is approaching an intersection and that heavy vehicle won't be able to stop with a change to the traffic signal lights. Thus, in this non-limiting example, device 410 may include a command in the electronic communication to wait two seconds before changing the traffic signal lights.

Figure 7A:
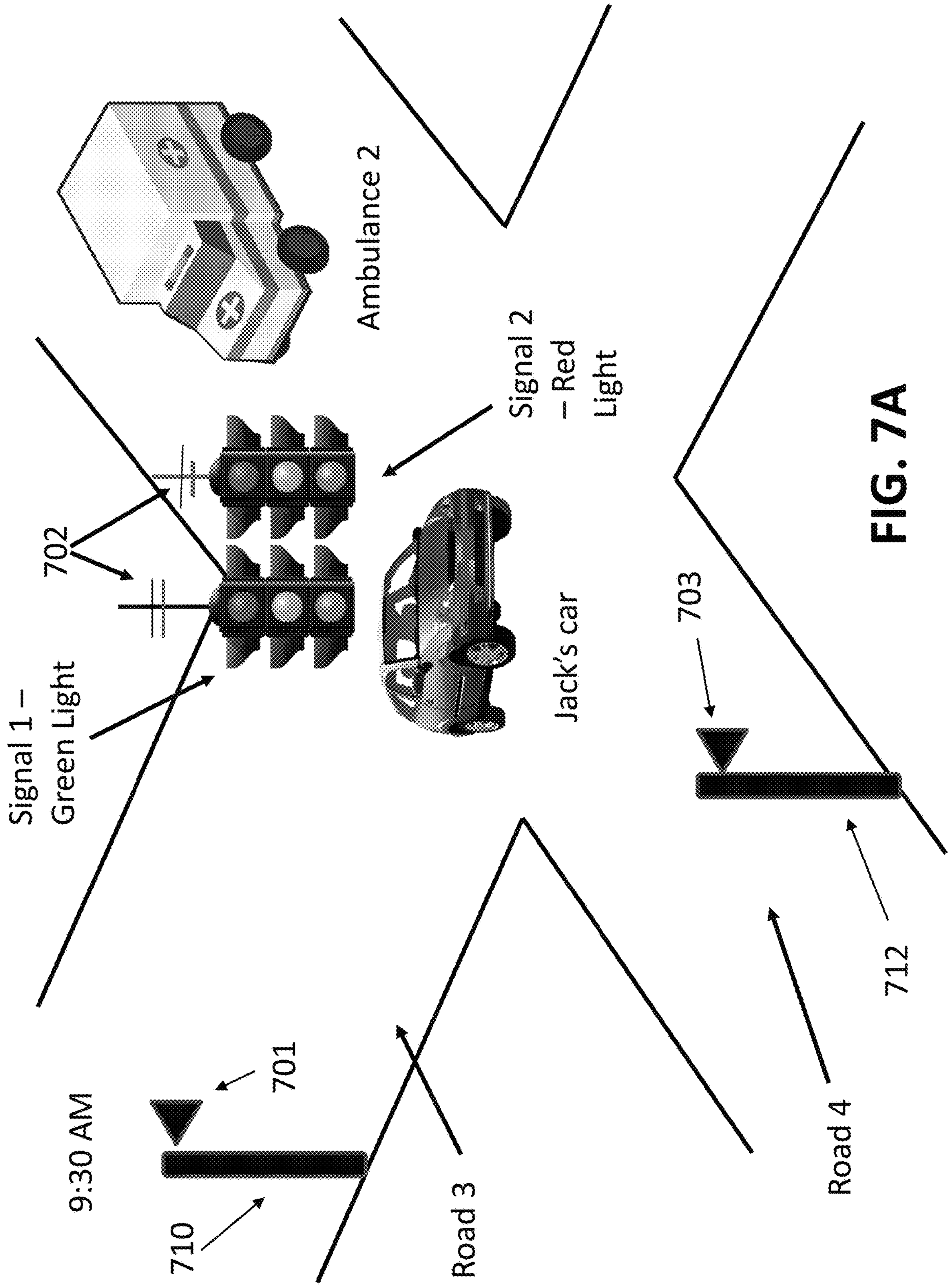
FIGS. 7A and 7B are examples system for determining the source of a sound.
Figure 7B:
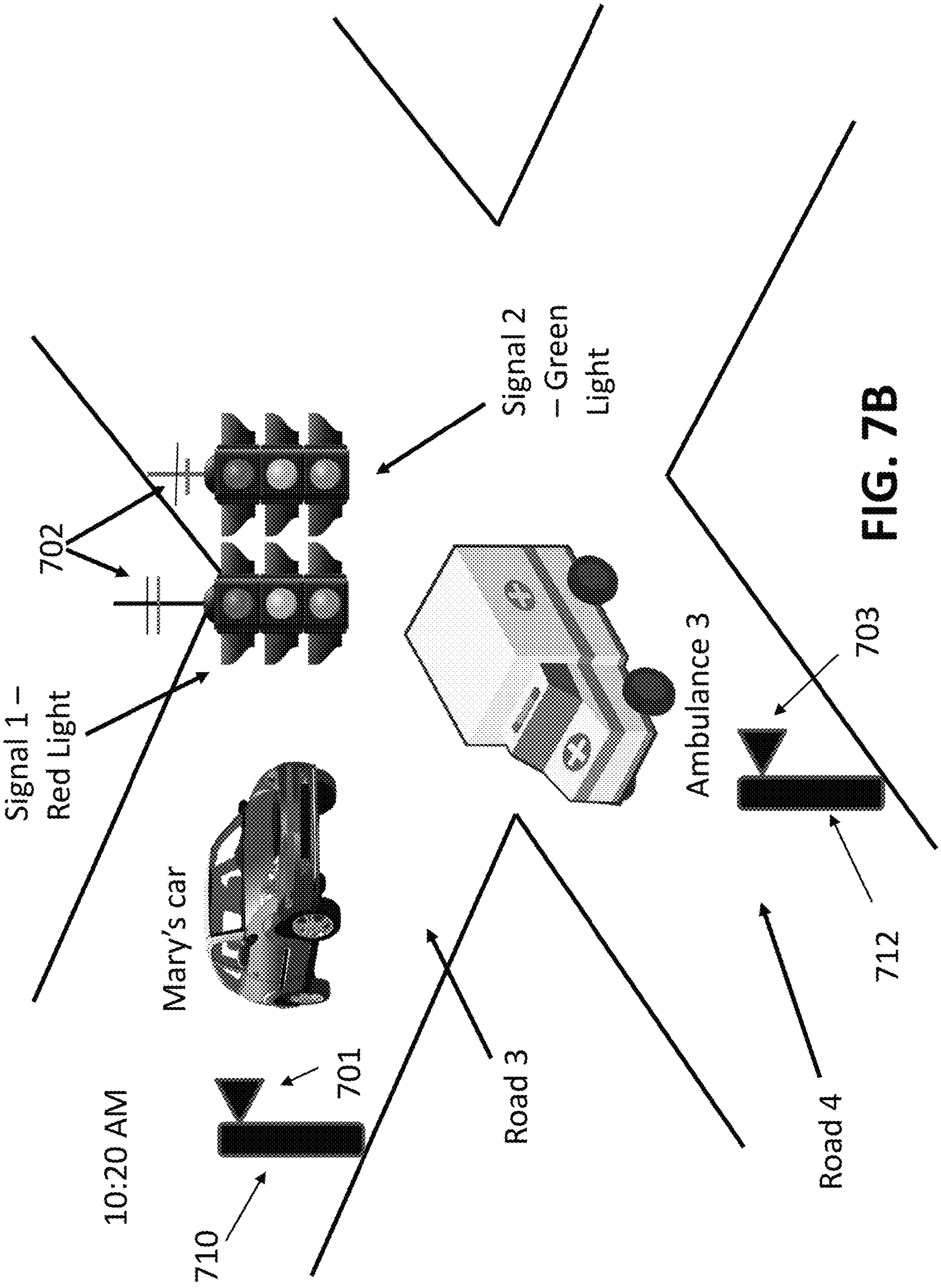

FIGS. 7A and 7B are examples showing a system for controlling traffic signals based on the source of a particular noise. As shown in FIG. 7A, at 9:30 AM, Signal 1 is a green light and Jack's car is passing through the intersection. Also, shown in FIG. 7A, Ambulance 2 is stopped since Signal 2 is a red light. Since Ambulance 2's sirens are not on, no sound is being emitted. Thus, microphone 703 (e.g., similar to microphone 404), located on utility pole 712, does not receive any sound which would result in Signal 2 from changing from a red light to a green light based on the processes described in FIGS. 4, 5, and/or 6. In addition, microphone 701 (e.g., similar to microphone 404), located on utility pole 710, also is not receiving any sound information that would result in Signal 1 changing from a green light to a red light. While a single microphone is shown on road 3 and another single microphone is shown on road 4, there may be multiple microphones on a particular road and can be used in combination by a computing system to determine that the noise is from an emergency vehicle.

As shown in FIG. 7B, at a later time, 10:20 AM, Mary's car is travelling on Road 3 and Ambulance 3 is travelling on Road 4. In this non-limiting example, Ambulance 3 has its sirens on and as Mary's car is not an emergency vehicle, no siren sound is emitted. In this non-limiting example, microphone 703 receives the sound information of Ambulance 3 and microphone 701 receives no sound information associated with an emergency vehicle. As a result, based on the sound information sent by microphone 703 to a learning system (e.g., device 406 and device 410) which determines changing Signal from a red light to a green light. Thus, the learning system sends information to communication system 702 on Signal 2 results in Signal 2 changing from a red light to a green light (and Signal 1 changing from a green light to a red light) based on the processes described in FIGS. 4, 5, and 6. Thus, Mary's car stops and Ambulance 3 passes through the intersection.

Figure 8:
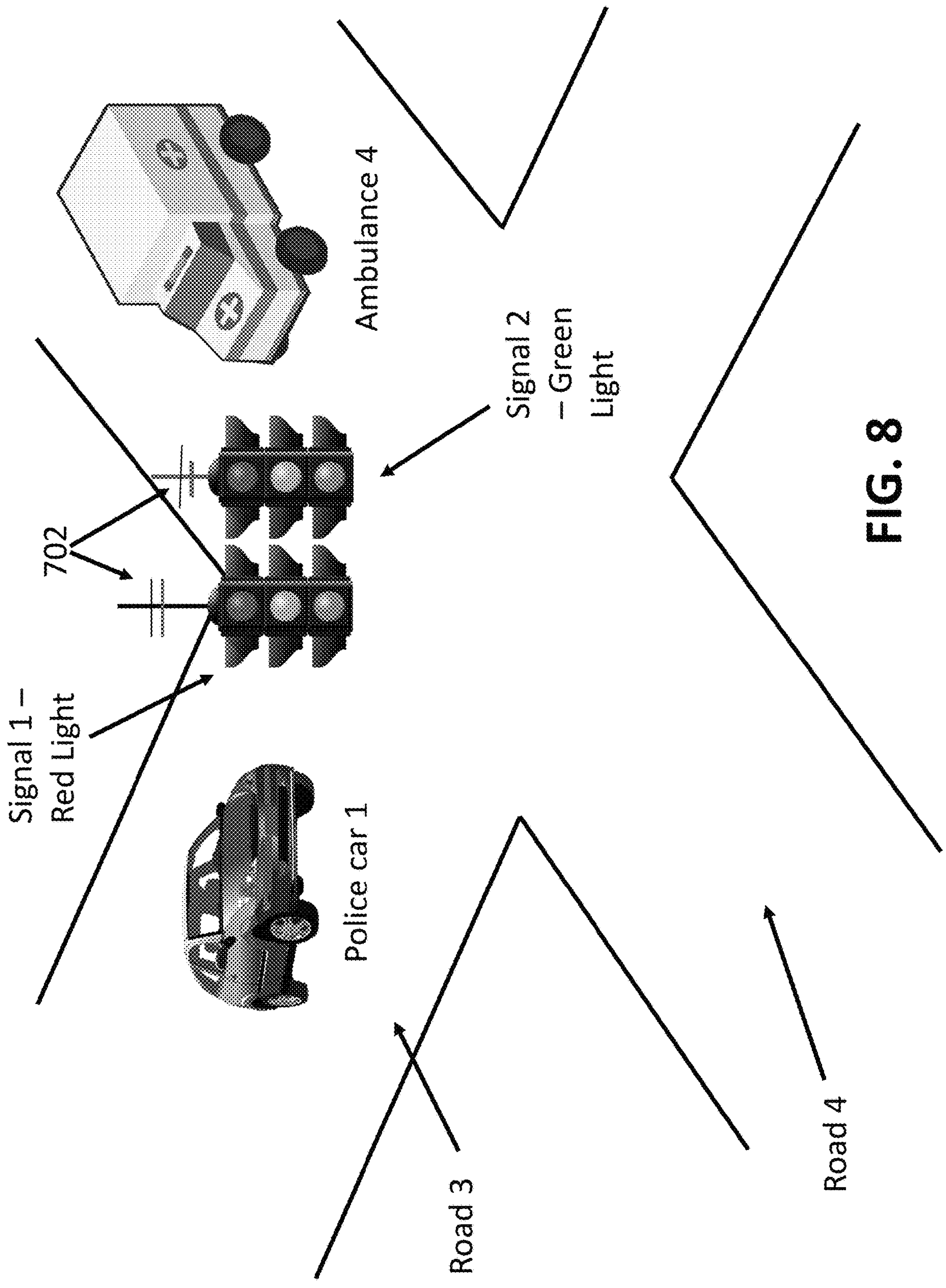
FIG. 8 is an example system for determining the source of a sound.

FIG. 8 shows an example of when two emergency vehicles enter a particular traffic intersection. As shown in FIG. 8, Police Car 1 is travelling on Road 3, and Ambulance 4 is travelling on Road 4. In this non-limiting example, both the police car and the ambulance have active sirens and are going to different emergency events. For example, Police Car 1 is going to the scene of a robbery while Ambulance 4 is going to the scene of a traffic accident. In this non-limiting example, the municipality, in which the police car and the ambulance are located, may have a hierarchical system of emergency vehicles that provides a preference to one type of emergency vehicle over another type of emergency vehicle. For example, fire trucks may be given the highest ranking, then ambulances, and then police vehicles. In this non-limiting example, microphones (e.g., microphone 404) may be connected to each of the traffic signals (e.g., incorporated as part of each traffic signal).

In this non-limiting example, an example municipality may determine that ambulances have a greater preference than police vehicles. Thus, in this non-limiting example, microphones (which in this example are part of the traffic signal) may receive the siren sounds of Ambulance 4 and Police Car 1 and send the sounds to one or more devices (e.g., device 406 and device 410) that determine that the Signal 1 should be a red light and Signal 2 should be a green light (e.g., device 406 and/or 410 may send electronic information to communication system 702 on each of Signal 1 and 2).

Figure 9:
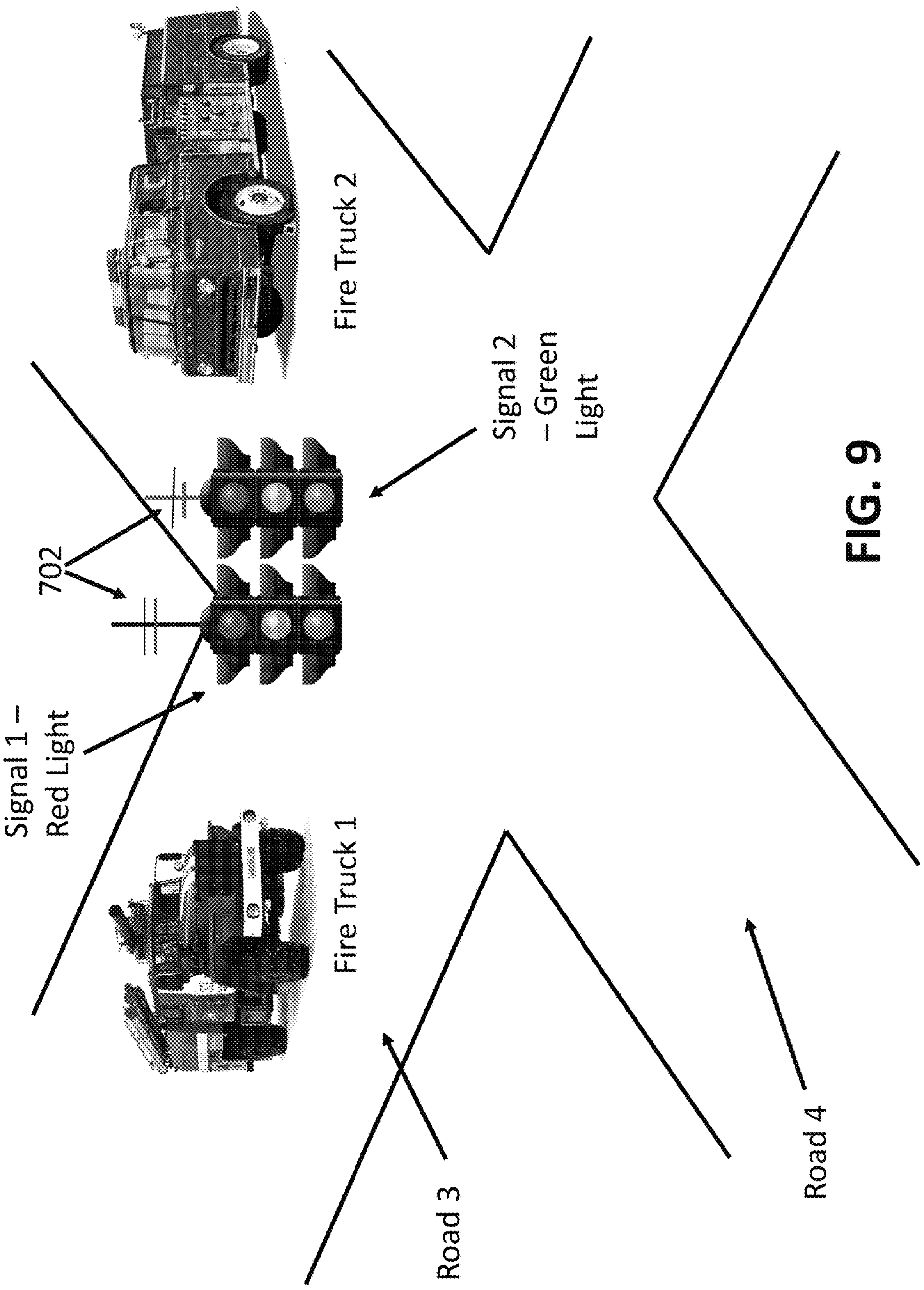
FIG. 9 is an example system for determining the source of a sound.

FIG. 9 is an example of when two emergency vehicles of the same type enter a traffic intersection. As shown in FIG. 9, two fire trucks are entering the traffic intersection and both are on their way to separate emergencies. In embodiments, the siren sound of each fire truck may be different. In this non-limiting example, Fire Truck 1 has a siren sound with a first type of pitch and Fire Truck 2 has a siren sound with a second type of pitch. In this non-limiting example, communication system 702 may receive both siren sounds and send both sounds to one or more devices (e.g., device 406, device 410, etc.) that determine that, based on the siren sound of Fire Truck 1, the Signal 1 should be green and that Signal 2 should be red. Thus, Fire Truck 2 is given the preference and passes through the intersection. In other examples, the preference may also be based on the size of the roads at the intersection (a road with more lanes may be associated with typically heavier levels of traffic and may be given preference).

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

While various actions are described as selecting, displaying, transferring, sending, receiving, generating, notifying, and storing, it will be understood that these example actions are occurring within an electronic computing and/or electronic networking environment and may require one or more computing devices, as described in FIG. 2, to complete such actions. Furthermore, it will be understand that sound may be interchanged with noise, audio, audible sound, or any other term that indicate the creation of a sound. It will also be understood that other types of computing devices and/or systems may be substituted for a Raspberry Pi system. Also, it will be understood that any of the various actions can result in any type of electronic information to be displayed in real-time and/or simultaneously on multiple devices. For FIGS. 5 and 6, the order of the blocks may be modified in other implementations. Further, non-dependent blocks may be performed in parallel.

While the above figures, examples, and embodiments describe indicate sound, noise may be used interchangeably.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. An electronic communications method, comprising:

receiving, by a device, first electronic information, wherein:

the first electronic information is from a first microphone, the first electronic information is based on a first audible sound from a first vehicle that is approaching a first traffic light at an intersection, the first electronic information is sent during a first particular period of time, and the first microphone is connected to a pole with the attached first traffic light;

receiving, by the device, second electronic information, wherein:

the second electronic information is from a second microphone, the second electronic information is based on a second audible sound from a second vehicle that is approaching a second traffic light at the intersection, the second electronic information is sent during a second particular period of time, the second particular period of time is different than the first particular period of time, and the second microphone is connected to a building;

analyzing, by the device, the first electronic information and the second electronic information, wherein the analyzing includes:

the device using Convolutional Neural Networks (CNN) and Long Short Term Memory (LSTM) systems to analyze the first electronic information and the second electronic information, analyzing previously received noise information that occurred at other discreet time events, analyzing stored sounds from non-emergency vehicles, analyzing other stored sounds from emergency vehicles, analyzing additional stored sounds, wherein the additional stored sounds are based on vehicle engine size, determining a first vehicle type based on the first electronic information, the stored sounds, the other stored sounds, the additional stored sounds, and the previously received noise information, determining a second vehicle type based on the second electronic information, the store sounds, the other stored sounds, the additional stored sounds, and the previously received noise information;

determining, by the device, that the first vehicle type has priority over the second vehicle type to pass through the intersection;

sending, by the device, a first electronic command to the first traffic light to change, or stay, red; and sending, by the device, a second electronic command to the second traffic light to change, or stay, green.

2. The electronic communications method of claim 1, wherein the first electronic information includes sound from a first type of siren.

3. The electronic communications method of claim 1, wherein the first electronic information is received as a spectrogram.

4. The electronic communications method of claim 3, wherein the second particular period of time is based on posted speed limits for a particular road passing through the intersection.

5. The electronic communications method of claim 3, wherein the analyzing further includes analyzing types of buildings around the intersection.

6. The electronic communication method of claim 1, wherein the analyzing further includes analyzing prior accident information that has occurred at the intersection.

7. The electronic communications method of claim 1, wherein the first electronic command is sent at a different time than when the second electronic command is sent.

8. The electronic communications method of claim 1, wherein the analyzing further includes analyzing electronic images of different vehicles passing through the intersection and other sections that are received by the device.

9. The electronic communications method of claim 1, wherein the first electronic information includes electronic labels, wherein the electronic labels include location, time of day, and traffic signal information.

10. The electronic communications method of claim 1, wherein the device is actively trained to determine vehicle type based on simultaneously receiving the first electronic information, the second electronic information, and third electronic information, from a third vehicle type, based on learning how different noises are associated with different sources.

11. The electronic communications method of claim 1, wherein the analyzing further includes analyzing a presence or absence of honking horn sounds occurring at the intersection, wherein the absence of the honking horn sounds indicates an emergency vehicle near the intersection.

12. The electronic communications method of claim 1, wherein the first period of time is measured in a first quantity of seconds, and wherein the first period of time is different at a first hour of a day versus a second hour of the day.

13. The electronic communications method of claim 12, wherein the second period of time is measured in a second quantity of seconds, and wherein the second period of time is different at a third hour of a day versus a fourth hour of the day.

14. The electronic communications method of claim 1, wherein the analyzing further includes analyzing a third period of time, wherein the third period of time is measured in a third quantity of seconds and the third period of time is based on another intersection that includes a third traffic light.

15. The electronic communications method of claim 14, wherein the third period of time is based on a geographic location.

16. The electronic communications method of claim 1, wherein the first vehicle type is one type of emergency vehicle and the second vehicle type is another type of emergency vehicle.

* * * * *